Feb. 17, 1970   K. NEUDECKER ET AL   3,495,901
MOTION PICTURE CAMERA
Filed Feb. 1, 1968
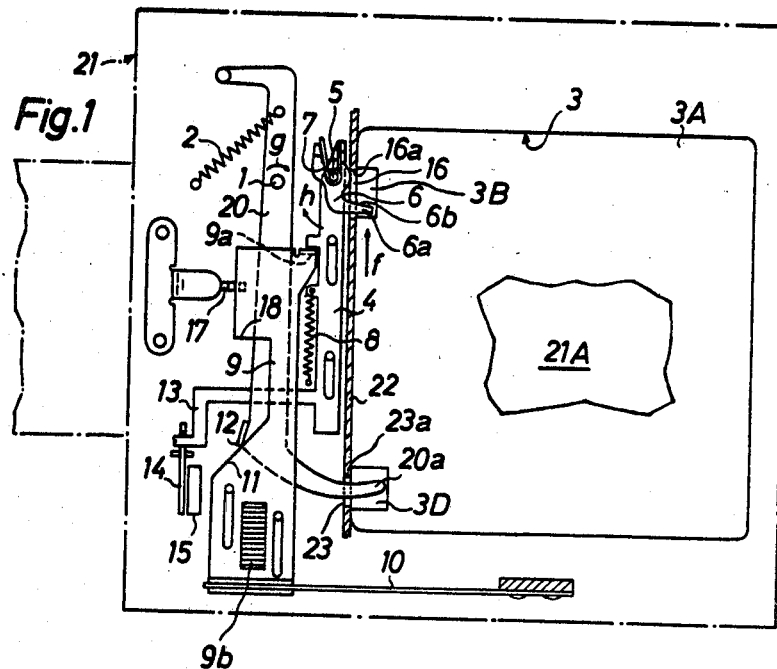
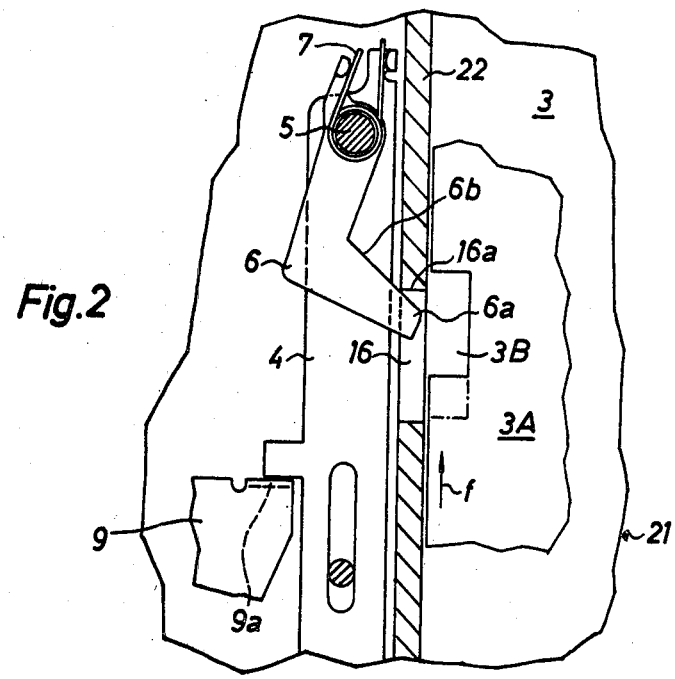
INVENTOR.
KARL NEUDECKER
MANFRED FEISTL
BY
Michael S. Striker
Attorney

United States Patent Office 3,495,901
Patented Feb. 17, 1970

3,495,901
MOTION PICTURE CAMERA
Karl Neudecker and Manfred Feistl, Munich, Germany, assignors to Agfa-Gevaert Aktiengesellschaft, Leverkusen, Germany
Filed Feb. 1, 1968, Ser. No. 702,382
Claims priority, application Germany, Feb. 11, 1967, A 27,147
Int. Cl. G03b 23/02
U.S. Cl. 352—72                                                            10 Claims

ABSTRACT OF THE DISCLOSURE

An 8-millimeter motion picture camera which employs magazines of the type having information encoded thereon to condition the exposure control. The housing of the camera has a chamber which accommodates a magazine and is located behind a wall having two openings for the arms of two detector levers which are biased by springs to normally extend through the respective openings and into engagement with the magazine in the chamber to thereby adjust the exposure control as a function of the sensitivity of film in the magazine and as a function of the type of film (i.e., daylight film or artificial-light film). A cover for the chamber is movable from closed to open position and a link train thereby causes the arms of the two levers to engage guide faces bounding the respective openings in the wall and to travel along such guide faces to be withdrawn from the chamber preparatory to or in response to movement of the cover to open position so that the operator cannot damage the levers during removal or insertion of a magazine.

BACKGROUND OF THE INVENTION

The present invention relates to motion picture cameras in general, and more particularly to improvements in motion picture cameras of the type utilizing film-containing magazines provided with information encoded thereon to automatically condition the exposure control of the camera in response to insertion into a chamber in the housing of the camera.

Conventional cameras which utilize such magazines are normally provided with one or more spring-biased detectors which extend into the chamber of the camera housing and sense the information encoded on the magazine to adjust the exposure control as a function of the sensitivity of film in the magazine, as a function of the type of film (e.g., whether the film is intended for use in daylight or in artificial light), and/or as a function of another characteristic of the film. As a rule, the detectors are reciprocable with reference to the housing and are arranged to move in a first direction toward and in a second direction away from engagement with the magazine. Each detector is biased in the first direction so that it can yield during insertion of a fresh magazine in order to avoid damage to its magazine-engaging portion. However, a careless operator is still likely to damage the detector or detectors, particularly during improper insertion of a fresh magazine.

SUMMARY OF THE INVENTION

It is an object of our invention to provide a motion picture camera for use with film-containing magazines having information encoded thereon to condition the exposure control, and to construct and assemble the detector or detectors of the camera in such a way that they cannot be damaged during insertion or removal of a magazine irrespective of whether the insertion or removal is carried out in the prescribed way.

Another object of the invention is to provide a motion picture camera wherein, in order to gain access to a magazine in the chamber of the housing or in order to be able to remove a magazine with exposed film, the user of the camera is compelled to move the detector or detectors to a position in which they cannot be damaged by the magazine.

A further object of the invention is to provide a novel connection between one or more detectors and the mechanism which locks a cover for the magazine-accommodating chamber in closed position.

An additional object of the invention is to provide a motion picture camera wherein the parts which transmit motion to one or more detectors occupy little room and are sufficiently rugged and reliable to be useful in cameras for inexperienced amateur photographers.

The motion picture camera of our invention comprises a housing having a magazine-accommodating chamber located at one side of an internal wall or partition provided with at least one opening, a cover which forms part of the housing and is movable between open and closed positions to respectively expose and seal the chamber, a detector movably installed in the housing at the other side of the wall and having a sensing portion extendable through the opening in the wall and into the chamber to sense the information encoded on a magazine in the chamber, biasing means for urging the sensing portion into engagement with the information on the magazine in the chamber, and motion transmitting means for moving the sensing portion against and along a guide face bounding the opening in the wall in response or preparatory to movement of the cover to open position whereby the guide face in the opening of the wall causes the sensing portion to leave the chamber against the opposition of the biasing means.

For example, the motion transmitting means may comprise a slide which is reciprocable in the housing and carries a pivot pin for a lever-shaped detector, and a locking lever which normally holds the cover in closed position and can transmit motion to the slide to thereby pivot the detector in response to movement of the locking lever to a position which it assumes preparatory or in response to movement of the cover to open position.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of a specific embodiment with reference to the accompanying drawing.

BRIEF DESCRIPTION OF THE DRAWING

FIG. 1 is a schematic longitudinal vertical sectional view of an 8-millimeter motion picture camera which embodies our invention; and FIG. 2 is an enlarged view of a detail in the camera of FIG. 1, showing a detector in retracted position.

DESCRIPTION OF THE PREFERRED EMBODIMENT

The camera of our invention comprises a housing 21 which is indicated by phantom lines and accommodates a detector lever 20 pivotable on a fixed pin 1. A spring 2 biases the detector lever 20 in a counterclockwise direction, as viewed in FIG. 1, so that a sensing portion or arm 20a of the detector lever normally extends into a chamber 3 serving to accommodate a magazine or cassette 3A. The chamber 3 can be exposed from one side of the housing 21, i.e., the latter comprises a door or cover which is either pivotably or removably attached to the remainder of the housing and can be moved between a closed and an open position to respectively seal and expose the chamber 3. The magazine 3A is insertable sideways, namely, in a direction at right angles to the plane of FIG. 1.

The housing 21 further accommodates a reciprocable motion transmitting member or slide 4 the upper end portion of which carries a pivot pin 5 for a second detector lever 6. A torsion spring 7 is convoluted around the pivot pin 5 and operates between the slide 4 and detector lever 6 in such a way that the sensing portion or arm 6a of the detector lever 6 tends to penetrate into the chamber 3. The slide 4 is biased by a helical spring 8 which tends to hold it in the position shown in FIG. 1, i.e., in a lower end position. The slide 4 then causes the aforementioned cover or door 21A to remain in sealing or closed position. The locking action is effected by way of a motion transmitting lever 9 which is biased by a leaf spring 10. The lever 9 has a projection or lug 9a which can displace the slide 4 in upward direction, as viewed in FIG. 1, i.e., in opposition to the spring 8. The lever 9 is further provided with a cam 11 having an inclined cam face cooperation with a follower 12 provided on the detector lever 20. The slide 4 has an extension 13 for a mask 14 which can be moved in front of a photosensitive receiver 15 located in the path of incoming scene light.

If the door or cover 21A is to be moved to open position, the motion transmitting lever 9 is moved against the action of the leaf spring 10 (see the arrow f). The lever 9 then displaces the slide 4 through the intermediary of its projection 9a and the slide 4 causes the detector lever 6 to move the edge face 6b of its arm 6a against a horizontal guide face 16a bounding the upper end of an opening or slot 16 provided in an internal wall or partition 22 of the housing 21. The partition 22 is located in front of the chamber 3 and behind the detector levers 6, 20. As the slide 4 continues to move upwardly (arrow f), the edge face 6b of the arm 6a slides along the guide face 16a in the opening 16 and causes the detector lever 6 to pivot in the direction indicated by arrow h whereby the arm 6a leaves the chamber 3 and ultimately assumes the retracted position shown in FIG. 2. Thus, the arm 6a is then withdrawn from the chamber 3 and cannot interfere with removal of the magazine 3A or with insertion of a fresh magazine. The manner in which the operator inserts a fresh magazine is immaterial because the magazine cannot damage or deform the detector lever 6.

The cam 11 causes the follower 12 to move the detector lever 20 in the direction indicated by arrow g whereby the sensing portion or arm 20a of the lever 20 leaves the chamber 3 while the slide 4 moves upwardly. When the lever 9 reaches its upper end position, an arresting member 17, here shown as a leaf spring, engages its edge face 18 to hold the detector levers 6 and 20 in inoperative or retracted positions. The levers 6 and 20 remain in such retracted positions during insertion of a fresh magazine. The arm 20a of the detector lever 20 cannot be damaged even if the freshly inserted magazine does not have encoded information in the form of a recess or marker 3D which accommodates a portion of the arm 20a when the chamber 3 is sealed. The arm 6a detects the sensitivity of film in a magazine 3A, i.e., its angular position in closed position of the door 21A is a function of such film sensitivity. The magazine 3A has a second encoded information or marker in the form of a recess 3B which accommodates a portion of the arm 6a and the depth of the recess 3B is indicative of the sensitivity of film in the magazine 3A. The aforementioned marker or recess 3D of the magazine 3A can accommodate the tip of the arm 20a on the detector lever 20. The lever 20 controls the position of a filter (not shown) which can be swung into or away from the path of the incoming light, depending upon the depth and/or presence or absence of the marker or recess 3D. For example, the filter can be swung into the path of incoming light when the magazine 3A contains a film which is intended for exposures in artificial light and the magazine 3A is without a recess 3D if it contains a supply of daylight motion picture film.

The motion transmitting lever 9 has a handgrip portion 9b which can be grasped by a finger prior to moving the lever 9 against the opposition of the leaf spring 10. The arresting spring 17 is disengaged from the edge face 18 when the cover or door 21A is returned to closed position.

An important advantage of the structure shown in the drawing is that the detector levers 6 and 20 can move their sensing portions or arms 6a, 20a away from the magazine 3A and out of the chamber 3 in automatic response to movement of the cover 21A to open position so that such sensing portions are invariably out of the way during removal or insertion of magazines. At least the detector lever 6 is movable to retracted position by the wall 22, i.e., by the guide face 16a in the upper opening 16 of this wall. Thus, by the simple expedient of providing the detector lever 6 with a suitably inclined edge face 6b, the wall 22 insures that the arm 6a leaves the chamber 3 in good time before the cover 21A affords access to a magazine containing exposed film and that the arm 6a reenters the chamber 3 only when a fresh magazine is already inserted into the chamber.

Our motion picture camera is susceptible of many modifications without departing from the spirit of the present invention. For example, the filter controlling detector lever 20 can be mounted in such a way that it moves in the direction indicated by arrow f when it moves in response to actuation of the motion transmitting means 9 and 4. The arm 21a is then preferably provided with an edge face corresponding to the edge face 6b on the arm 6a of the detector lever 6 to cooperate with the guide face 23a in the lower opening 23 of the wall 22.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a motion picture camera which employs film-containing magazines of the type having information encoded thereon to condition the exposure control of the camera, a combination comprising a housing having a magazine-accommodating chamber, wall means having one side adjacent to said chamber and provided with at least one opening bounded by a guide face, and cover means movable between open and closed positions to respectively expose and seal said chamber; a detector movably installed in said housing at the other side of said wall means and having a sensing portion adapted to extend through said opening and into said chamber to detect information encoded on a magazine in said chamber; biasing means for urging said sensing portion into said chamber; and motion transmitting means for moving said sensing portion against and along said guide face in response to movement of said cover means to open position whereby said guide face causes said sensing portion to leave said chamber against the opposition of said biasing means.

2. A combination as defined in claim 1, wherein said motion transmitting means comprises a lever arranged to normally hold said cover means in closed position.

3. A combination as defined in claim 2, wherein said motion transmitting means further comprises a slide reciprocable by said lever and supportingly connected with said detector.

4. A combination as defined in claim 3, wherein said detector is a lever and further comprising pivot means turnably connecting said last mentioned lever to said slide.

5. A combination as defined in claim 4, wherein said biasing means comprises a spring operating between said slide and said last mentioned lever.

6. A combination as defined in claim 3, further comprising resilient means for biasing said slide against said lever.

7. A combination as defined in claim 1, further comprising arresting means for yieldably holding said motion transmitting means in a position corresponding to open position of said cover means.

8. A combination as defined in claim 1, wherein said wall means is provided with a second opening bounded by a second guide face, and further comprising a second detector provided in said housing at said other side of said wall means and having a sensing portion movable through said second opening to engage a portion of a magazine in said chamber, second biasing means for urging said sensing portion of said second detector into said chamber, and means provided on said second detector and said motion transmitting means for moving said sensing portion of said second detector against and along said second guide face in response to movement of said cover means to open position whereby said second guide face causes said sensing portion of said second detector to leave said chamber.

9. A combination as defined in claim 8, wherein the means for moving said sensing portion of said second detector comprises a cam provided on said motion transmitting means and a follower provided on said second detector and arranged to track said cam.

10. A combination as defined in claim 1, wherein said detector is arranged to condition the exposure control as a function of the sensitivity of film in the magazine accommodated in said chamber.

References Cited

UNITED STATES PATENTS

| | | | |
|---|---|---|---|
| 3,208,363 | 9/1965 | Easterly. | |
| 3,312,158 | 4/1967 | MacMillin | 352—78 X |
| 3,314,344 | 4/1967 | Anwyl | 352—72 X |
| 3,421,422 | 1/1969 | Winkler | 352—72 X |

NORTON ANSHER, Primary Examiner

M. H. HAYES, Assistant Examiner

U.S. Cl. X.R.

95—10